United States Patent Office 2,975,175
Patented Mar. 14, 1961

2,975,175
PHENTHIAZINE DERIVATIVES

Robert Michel Jacob, Ablon-sur-Seine, and Jacques Georges Robert, Gentilly, France, assignors to Societe des Usines Chimiques Rhone-Poulenc, Paris, France, a French body corporate No Drawing. Filed Dec. 20, 1957, Ser. No. 704,011
Claims priority, application France Dec. 27, 1956
3 Claims. (Cl. 260—243)

This invention relates to new derivatives of phenthiazine and to processes for their preparation.

It is known that various 10-aminoalkyl-phenthiazines possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It is an object of the present invention to provide new phenthiazine derivatives which possess useful pharmacological properties. It is a further object of the invention to provide processes for the production of these new compounds.

The phenthiazine derivatives of the present invention are those which conform to the general formula:

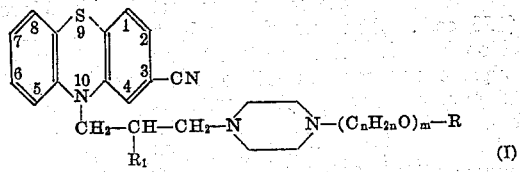

and their salts and quaternary ammonium derivatives, wherein R represents a hydrogen atom or an acyl group containing not more than 4 carbon atoms, $R_1$ represents a hydrogen atom or a methyl group, $n$ represents 2 or 3 and $m$ represents 1, 2 or 3. When $m$ is 2 or 3 the individual groups $(C_nH_{2n}O)$ may be the same or different.

The new phenthiazine compounds of the present invention may be prepared by the application of known methods for the production of 10-aminoalkyl-phenthiazines. By the words "known methods" as used in this specification is meant methods heretofore employed or described in the chemical literature.

The majority of methods so applied can be described generically as consisting in reacting a phenthiazine derivative of the general formula:

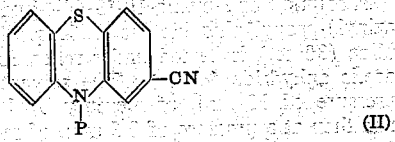

with a compound Q, the groups P and Q being such that Q will react with the phenthiazine derivative so as to introduce or form in the 10-position of the ring a substituent grouping of the structure:

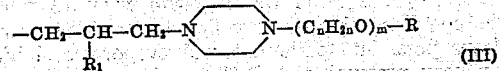

wherein R, $R_1$, $n$ and $m$ are as hereinbefore defined.
Preferred processes of manufacture are as follows:

(1) Interaction of 3-cyanophenthiazine with a reactive ester of the general formula:

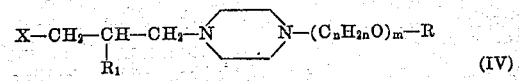

or a salt thereof (wherein X represents the acid residue of a reactive ester such as a halogen atom or a sulphuric or sulphonic ester residue, and R, $R_1$, $n$ and $m$ are as hereinbefore defined).

The reaction may be carried out with or without a solvent in the presence or absence of a condensing agent. It is advantageous to operate in an aromatic hydrocarbon solvent medium (for example, toluene or xylene) in the presence of a condensing agent, preferably in the form of an alkali metal or derivative thereof (such as, for example, hydride, amide hydroxide, alcoholate, metal alkyl or aryl) and more particularly metallic sodium, sodamide, powdered sodium or potassium hydroxide, lithium hydride, sodium tert-butylate, butyllithium or phenyllithium. The reaction is preferably carried out at the boiling temperature of the solvent. It is advantageous to use the reactive ester of Formula IV in the form of the free base in solution, for example, in benzene, toluene or xylene, and to add the solution to a mixture of the other reactants in which 3-cyanophenthiazine may already be present, at least in part in the form of an alkali metal salt. The reaction may also be carried out with a salt of the reactive ester of Formula IV but in this case a greater proportion of the condensing agent must be used in order to neutralise the acid of the salt employed.

In the case of preparation by this method of compounds in which R is hydrogen, it is preferred to carry out the reaction with the corresponding tetrahydropyranyl derivative, viz. R in Formula IV is the grouping

and to remove the pyranyl group from the product so obtained by acid hydrolysis.

In the case of preparation of compounds of general Formula I where R represents an acyl group, it is preferred to carry out the reaction in the presence of, as condensing agent, an alkali metal or an amide hydride thereof in preference to an alkali metal hydroxide or alcoholate.

(2) Interaction of a piperazine derivative of the general formula:

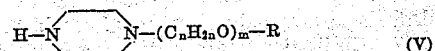

(wherein R, $n$ and $m$ are as hereinbefore defined) with a phenthiazine compound of the general formula:

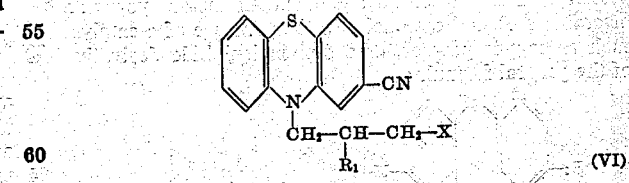

($R_1$ and X being as hereinbefore defined).

(3) Decomposition of a phenthiazine-10-carboxylate of the general formula:

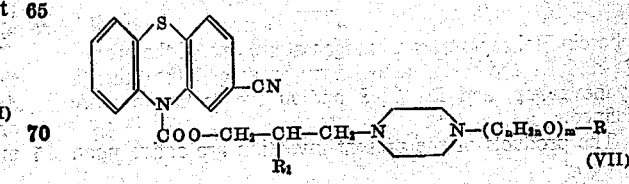

(wherein the various symbols are as hereinbefore defined) by heating the carboxylate to a temperature above 100° C. and preferably between 150° and 220° C. until evolution of carbon dioxide ceases.

The reaction can be effected with the phenthiazine-10-carboxylate alone, i.e. without a diluent, or in an inert medium such as diphenyl, diphenyl oxide or a chlorinated aromatic hydrocarbon, for example, o-dichlorobenzene, or in the classical diluents for decarboxylation, such, for example, as quinoline or weak bases of high boiling point.

(4) Interaction of a phenthiazine derivative of the general formula:

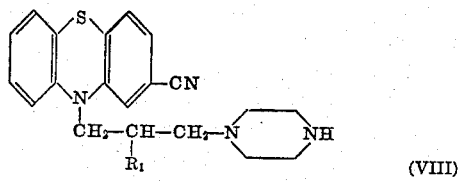

(wherein $R_1$ is as hereinbefore defined) with a reactive ester of the general formula:

$$X-(C_nH_{2n}O)_m-R$$

(wherein X, R, n and m are as hereinbefore defined) or, in the case of compounds of general Formula I where R is a hydrogen atom and m is 1, with ethylene oxide or propylene oxide.

(5) In the case of compounds of general Formula I wherein R is an acyl group, acylation by known methods of alcohols corresponding to the general formula in which R is a hydrogen atom. The acylation may be effected, for example, by means of a halide, anhydride or ester of the appropriate acid.

(6) In the case of compounds of general Formula I where m is 2 or 3, condensation of an alcohol of the general formula:

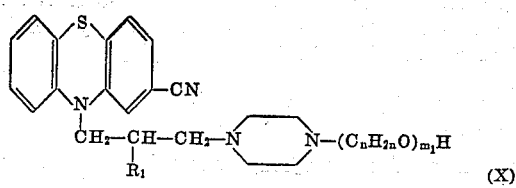

wherein $R_1$ and n are as hereinbefore defined and $m_1$ is 1 or 2, with a reactive ester of an alcohol of the formula $X-(C_nH_{2n}O)_{m_2}-R$, $m_1$ and $m_2$ being integers the sum of which is 2 or 3, and R and X being as hereinbefore defined. When $m_2$ is 1 and R represents a hydrogen atom, the reactive ester may be replaced by ethylene or propylene oxide according to whether n is 2 or 3.

Conversely, there may be employed for the condensation reactive esters corresponding to the alcohols and alcohols corresponding to the aforesaid reactive esters.

(7) Cyclisation, preferably in a solvent in the form of a substituted amide of a lower aliphatic acid, such as a formamide or an acetamide, or dimethylaniline, in the presence of a condensing agent (alkali metal hydroxide or carbonate) and optionally in the persence of a catalyst such as copper powder, of a diphenylsulphide derivative of the general formula:

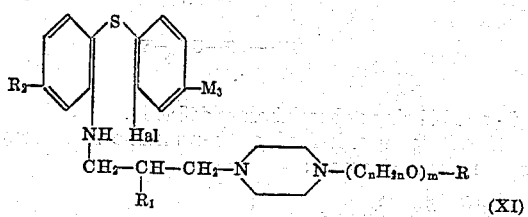

wherein Hal represents a halogen atom, one of the groups $R_2$ and $R_3$ represents a hydrogen atom and the other a cyano group, and R, $R_1$, n and m are as hereinbefore defined.

The products of the present invention are active upon the central nervous system and are also inhibitors of the vegetative nervous system. More particularly, they are outstanding tranquilizers and excellent antiemetics. In the classical tests for activity on the central nervous system (potentiation of narcosis, conditioned reflex test and the test of Winter and Flataker) and particularly in tests for antiemetic and cataleptic activity, they have shown themselves to be markedly superior to the most active products known.

For therapeutic purposes, the bases of general Formula I are preferably employed as such or in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, oxalates, methanesulphonates and ethanedisulphonates) so that the beneficial physiological properties inherent in the bases are not vitiated by side-effects ascribable to the anions. However, they may also be used in the form of quaternary ammonium salts obtained by reaction with organic halides (e.g. methyl or ethyl iodide, chloride or bromide or allyl or benzyl chloride or bromide) or other reactive esters.

The following examples, in which the melting points indicated were determined on the Kofler bench, illustrate the invention.

*Example I*

A solution of 3-(3-cyano-10-phenthiazinly)propyl toluene-p-sulphonate (7.7 g.) and 1-(2-hydroxyethyl)-piperazine (4.6 g.) in anhydrous toluene (60 cc.) is heated under reflux for 2 hours. After removal of the solvent at a pressure of 15 mm. of mercury the residual partially crystalline oil is taken up in chloroform (125 cc.). The chloroform phase is then washed with water (100 and 50 cc.) and extracted with about 0.2 N hydrochloric acid (100, and 50 cc.). The combined aqueous acid phases are treated with N sodium hydroxide (50 cc.) and the free base extracted with chloroform (150 cc.). After washing with water (100 cc.), the chloroform solutions are dried over anhydrous sodium sulphate and concentrated to dryness at a pressure of 15 mm. of mercury. The crude oily base obtained is converted into the methanesulphonate by dissolving in ethanol (80 cc.) and adding a solution of methanesulphonic acid (2.63 g.) in ethanol (20 cc.). 3-cyano-10-[3-(4-β-hydroxyethyl-1-piperazinyl)propyl]penthiazine di-methanesulphonate (7.7 g.) is obtained as a yellow crystalline powder, M.P. 238–240° C.

The initial 3-(3-cyano-10-phenthiazinyl)propyl toluene-p-sulphonate, M.P. 151° C., is obtained by the action of toluene-p-sulphonyl chloride on 3-cyano-10-(3-hydropropyl)phenthiazine in pyridine. The 3-cyano-10-(3-hydroxypropyl)phenthiazine, M.P. 141° C., is obtained by the acid hydrolysis of 3-cyano-10-(3-tetrahydropyranyl-oxypropyl)phenthiazine, M.P. 105–180° C., itself obtained by condensing 3-cyanophenthiazine with 1-tetrahydropyranyloxy-3-chloropropane in xylene in the presence of sodamide.

*Example II*

A solution of 3-cyano-10-[3-(4-β-hydroxyethyl-1-piperazinyl)-propyl]phenthiazine (2.62 g.) in anhydrous pyridine (30 cc.) is heated under reflux for 1½ hours with acetic anhydride (4 cc.). The solvent is removed at a pressure of 15 mm. of mercury by heating at 80° C. and then at a pressure of 0.5 mm. of mercury by heating for ½ hour at 100° C. The residual oil is taken up in chloroform (40 cc.) and the solution shaken with 5% potassium carbonate solution (40 cc.). The aqueous alkaline phase is separated and extracted with chloroform (2 x 40 cc.). After washing with water (3 x 40 cc.), the combined chloroformic liquids are dried over anhydrous potassium carbonate and evaporated, initially at ordinary pressure and finally under a pressure of 0.5 mm. of mercury by heating at 80° C. for ½ hour. The crude oily base obtained (2.9 g.) is converted into the dimaleate by the action of maleic acid in ethanol.

3-cyano-10-[3-(4-β-acetoxyethyl-1-piperazinyl)propyl]-phenthiazine dimaleate is thus obtained in the form of a crystalline powder melting at 220–224° C.

*Example III*

A solution of 3-cyano-10-[3-(1-piperazinyl)propyl]-phenthiazine (15 g.) and 3-chloropropanol (4.7 g.) in toluene (30 cc.) is heated for 4 hours under reflux in the presence of anhydrous potassium carbonate (6.8 g.). After cooling to 80° C., water (30 cc.) is added and the mixture is cooled to 20° C. The condensation product which crystallises is filtered off, washed with water (30 cc.) and toluene (2 x 30 cc.) and then dried in a desiccator. After recrystallisation from isopropanol there is obtained 3-cyano-10-[3-(4-γ-hydroxypropyl-1-piperazinyl)propyl]phenthiazine (8.8 g.) as a yellow crystalline powder, M.P. 135–136° C.

*Example IV*

A solution of 3-cyano-10-[3-(1-piperazinyl)-2-methylpropyl]phenthiazine (17.7 g.) and 2-bromoethanol (6.75 g.) in toluene (30 cc.) is heated for 8 hours under reflux in the presence of anhydrous potassium carbonate (7.4 g.). After cooling, chloroform (100 cc.) and water (50 cc.) are added and the basic products are extracted from the chloroform layer with 10% sulphuric acid. After decantation, the aqeous phase is made alkaline with sodium carbonate and the base is extracted with chloroform. The chloroform solution is washed several times with water, dried over anhydrous potassium carbonate and evaporated under reduced pressure. A crude resinous base (13.2 g.) is obtained. By preparing the acid dimaleate in ethanol and recrystallising from methanol, there is finally obtained 3-cyano-10-[3-(4-β-hydroxyethyl-1-piperazinyl)-2-methylpropyl]phenthiazine acid dimaleate (4.2 g.), M.P. 196–197° C. (inst.).

*Example V*

3 - cyano - 10 - [3 - (4-β-hydroxyethyl-1-piperazinyl)-2-methylpropyl]-phenthiazine (4.55 g.) dissolved in pyridine (37 cc.) is heated for 1½ hours under reflux with acetic anhydride (5 cc.). When the reaction is complete, the solvent is removed under reduced pressure and the residue is dissolved in chloroform (50 cc.). The chloroform solution is washed several times with 10% solution of sodium carbonate, then with water and dried over anhydrous potassium carbonate. On evaporation of the solvent under reduced pressure a crude resinous base (3.75 g.) is obtained.

By formation of the acid dimaleate in ethanol and recrystallising from methanol, there is finally obtained 3 - cyano - 10-[3-(4-β-acetoxyethyl-1-piperazinyl)-2-methylpropyl]phenthiazine acid dimaleate (3.85 g.), M.P. 189–190° C.

*Example VI*

A solution of 3-(3-cyano-10-phenthiazinyl)propyl toluene-p-sulphonate (3.04 g.) and 1-(2-hydroxyethoxyethyl)-piperazine (2.49 g.) in toluene (50 cc.) is heated under reflux for 2 hours. After cooling, the toluene solution is washed with water (3 x 50 cc.) and extracted with 0.5 N hydrochloric acid (55 cc.). After decanting, the aqueous acid layer is washed with ether (50 cc.) and ethyl acetate (50 cc.). The base is liberated by the addition of sodium hydroxide ($d=1.33$, 5 cc.) and extracted with chloroform (40 cc.) and the chloroform layer is dried over sodium sulphate. The mixture is filtered and the solvent is removed in vacuo. After drying at 75° C. under 0.5 mm. of mercury, there is obtained 3 - cyano-10-[3-(4-hydroxyethoxyethyl-1-piperazinyl)propyl]phenthiazine (2.61 g.).

This base is dissolved in boiling ethanol (40 cc.) and a boiling solution of maleic acid (1.40 g.) in ethanol (40 cc.) is added. On cooling, the acid dimaleate precipitates. It is filtered off, washed with ethanol (3 x 10 cc.) and dried in vacuo. There is thus obtained 3-cyano-10 - [3-(4-hydroxyethoxyethyl-1-piperazinyl)propyl]phenthiazine acid dimaleate (3.69 g.), M.P. 209–210° C.

*Example VII*

Proceeding as in Example VI but commencing with 3-(3-cyano-10-phenthiazinyl)propyl toluene-p-sulphonate (6.61 g.) and 1-(2-hydroxyethoxyethoxyethyl)piperazine (8.75 g.) there is obtained 3-cyano-10-[3-(4-hydroxyethoxyethoxyethyl - 1 - piperazinyl)propyl]phenthiazine (6.42 g.), the dimaleate of which melts at 166–168° C.

*Example VIII*

3 - cyano - 10-[3-(1-piperazinyl)-2-methylpropyl]phenthiazine (6 g.), M.P. 101° C., dissolved in toluene (6 cc.) is boiled for 8 hours with dry potassium carbonate (2.95 g.) and 2-hydroxyethoxy-1-chloroethane (2.67 g.). When the reaction is complete, the reaction mixture is cooled and treated with chloroform (35 cc.) and water (25 cc.). After decanting the aqueous layer, the basic products are removed from the chloroform solution by several extractions with dilute hydrochloric acid. The acid fractions are combined, made alkaline with sodium carbonate and then extracted several times with chloroform. The chloroform solutions are combined and dried over anhydrous potassium carbonate. After evaporation of the solvent under reduced pressure, there is obtained a crude crystalline base (6.15 g.).

This base is purified by dissolving in a mixture of equal parts of benzene and cyclohexane and filtering through a column of alkaline alumina. After successive elutions with a mixture of equal parts of benzene and cyclohexane, with pure benzene and with mixtures containing benzene and 10%, 25% and 50% ethyl acetate, the eluates are combined and the solvent is distilled under reduced pressure. There is finally obtained 3-cyano-10-[3 - (4-hydroxyethoxyethyl-1-piperazinyl)-2-methyl-propyl]phenthiazine (4.5 g.), M.P. 106–108° C.

We claim:

1. 3 - cyano - 10 - [3-(4-β-hydroxyethyl-1-piperazinyl)-propyl]phenthiazine.
2. 3 - cyano - 10 - [3-(4-β-acetoxyethyl-1-piperazinyl)-propyl]phenthiazine.
3. 3 - cyano - 10-[3-(4-hydroxyethoxyethyl-1-piperazinyl)propyl]phenthiazine.

References Cited in the file of this patent

UNITED STATES PATENTS

| | | |
|---|---|---|
| 2,272,498 | Zerweck et al. | Feb. 18, 1942 |
| 2,534,237 | Cusic | Dec. 19, 1950 |
| 2,650,919 | Cusic | Sept. 1, 1953 |
| 2,766,235 | Cusic | Oct. 9, 1956 |
| 2,877,224 | Jacob | Mar. 10, 1959 |
| 2,889,328 | Sherlock et al. | June 2, 1959 |

OTHER REFERENCES

Schering: Australian Abstract 23,597/56, May 30, 1957.